(12) United States Patent  
Frederick et al.

(10) Patent No.: US 7,545,306 B2  
(45) Date of Patent: Jun. 9, 2009

(54) DIRECTLY SAMPLING RADIO FREQUENCY SIGNALS

(75) Inventors: Thomas J. Frederick, Chapel Hill, NC (US); Joseph P. Repke, Cary, NC (US)

(73) Assignee: Sirit Technologies Inc. (CA)

( * ) Notice: Subject to any disclaimer, the term of this patent is extended or adjusted under 35 U.S.C. 154(b) by 0 days.

(21) Appl. No.: 11/834,434

(22) Filed: Aug. 6, 2007

(65) Prior Publication Data

US 2009/0040084 A1  Feb. 12, 2009

(51) Int. Cl.  
H03M 1/12 (2006.01)

(52) U.S. Cl. ............... 341/155; 375/321; 329/304; 455/334

(58) Field of Classification Search ......... 341/130–160; 375/321, 324, 332, 316, 355; 455/334, 323, 455/234.1; 329/304, 357  
See application file for complete search history.

(56) References Cited

U.S. PATENT DOCUMENTS

| | | | | |
|---|---|---|---|---|
| 4,436,425 | A * | 3/1984 | Cole | 356/477 |
| 5,301,206 | A * | 4/1994 | Ishigaki et al. | 375/141 |
| 5,862,139 | A * | 1/1999 | Yanagi | 370/441 |
| 5,889,759 | A * | 3/1999 | McGibney | 370/207 |
| 5,901,347 | A * | 5/1999 | Chambers et al. | 455/234.1 |
| 6,067,329 | A * | 5/2000 | Kato et al. | 375/321 |
| 6,108,529 | A * | 8/2000 | Vice et al. | 455/323 |
| 6,522,684 | B2 * | 2/2003 | Okubo et al. | 375/147 |
| 6,654,595 | B1 * | 11/2003 | Dexter | 455/323 |
| 6,836,457 | B2 * | 12/2004 | Nakamura et al. | 369/59.22 |
| 7,023,947 | B2 * | 4/2006 | Kobayashi et al. | 375/376 |
| 2006/0111074 | A1 * | 5/2006 | Petilli et al. | 455/334 |

OTHER PUBLICATIONS

Ulrich Rhode: *Digital PLL Frequency Synthesizers: Theory and Design*, Prentice-Hall, 1993.  
John J. Podesta, "Phase Noise Cancellation in a Mixer Circuit: Analysis Using a Random Phase Function", Technical Report ARFSD-TR-95016 (48 pages).  
Robert B. Staszewski, Chan Fernando, and Poras T. Balsara, "Event-Driven Simulation and Modeling o Phase Noise of an RF Oscillator", IEEE Transactions on Circuits and Systems, Apr. 2005 (11 pages).  
ITU-T Recommendation G.810 (Aug. 1996) "Definitions and Terminology for Synchronization Networks" (29 pages).  
D.B. Leeson, "A Simple Model of Feedback Oscillator Noise Spectrum", Proceedings Letters, 1966 (2 pages).  
Thomas H. Lee and Ali Hajimiri, "Oscillator Phase Noise: A Tutorial", IEEE Journal of Sold-State Circuits, Mar. 2000 (11 pages).

* cited by examiner

*Primary Examiner*—Lam T Mai  
(74) *Attorney, Agent, or Firm*—Fish & Richardson P.C.

(57) ABSTRACT

The present disclosure is directed to a system and method for directly sampling RF signals. In some implementations, an RF reader includes a clock generator and an Analog-to-Digital Converter (ADC). The clock generator is configured to generate a sample clock signal based, at least in part, on an input signal associated with transmitting RF signals. The ADC is configured to directly sample RF signals in a receive path of the reader using the sample clock signal to generate a digital signal. Mixing of the RF signal and the sample clock, through the sampling process in the ADC, reduces phase noise associated with the transmission signal in the receive path.

24 Claims, 7 Drawing Sheets

DIRECTLY SAMPLING RADIO FREQUENCY SIGNALS

TECHNICAL FIELD

This invention relates to detecting Radio Frequency (RF) signals and, more particularly, to directly sampling radio frequency signals.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The present disclosure is directed to a: system and method for directly sampling RF signals. In some implementations, an RF reader includes a clock generator and an Analog-to-Digital Converter (ADC). The clock generator is configured to generate a sample clock signal based, at least in part, on an input signal associated with transmitting RF signals. The ADC is configured to directly sample RF signals in a receive path of the reader using the sample clock signal to generate a digital signal. Mixing of the RF signal and the sample clock, through the sampling process in the ADC, reduces phase noise associated with the transmission signal in the receive path.

The details of one or more embodiments of the invention are set forth in the accompanying drawings and the description below. Other features, objects, and advantages of the invention will be apparent from the description and drawings, and from the claims.

DESCRIPTION OF DRAWINGS

Like Preference symbols in the various drawings indicate like elements.

DETAILED DESCRIPTION

Figure 1A:
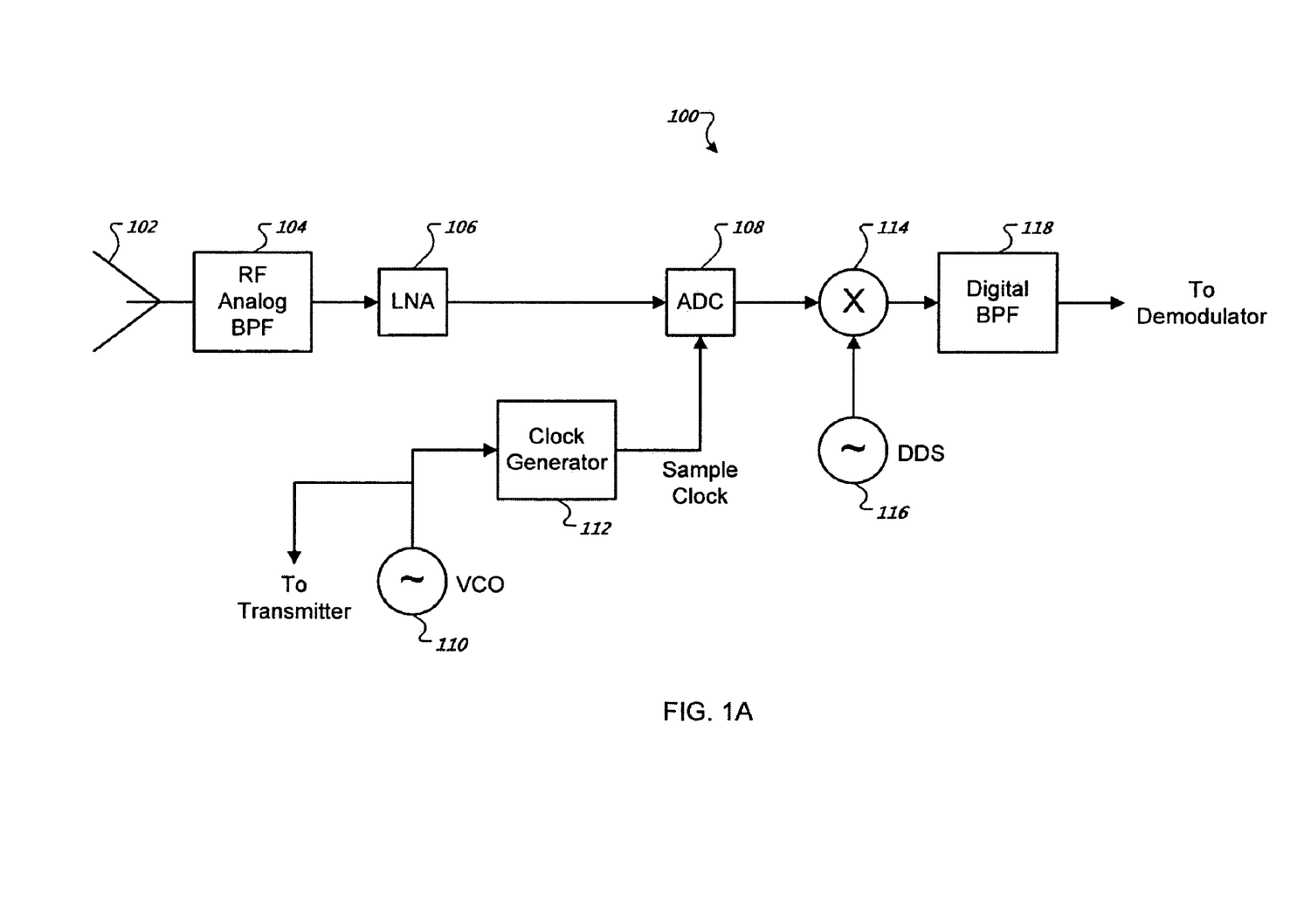
FIGS. 1A and 1B are example RF readers in accordance with some implementations of the present disclosure.
Figure 1B:
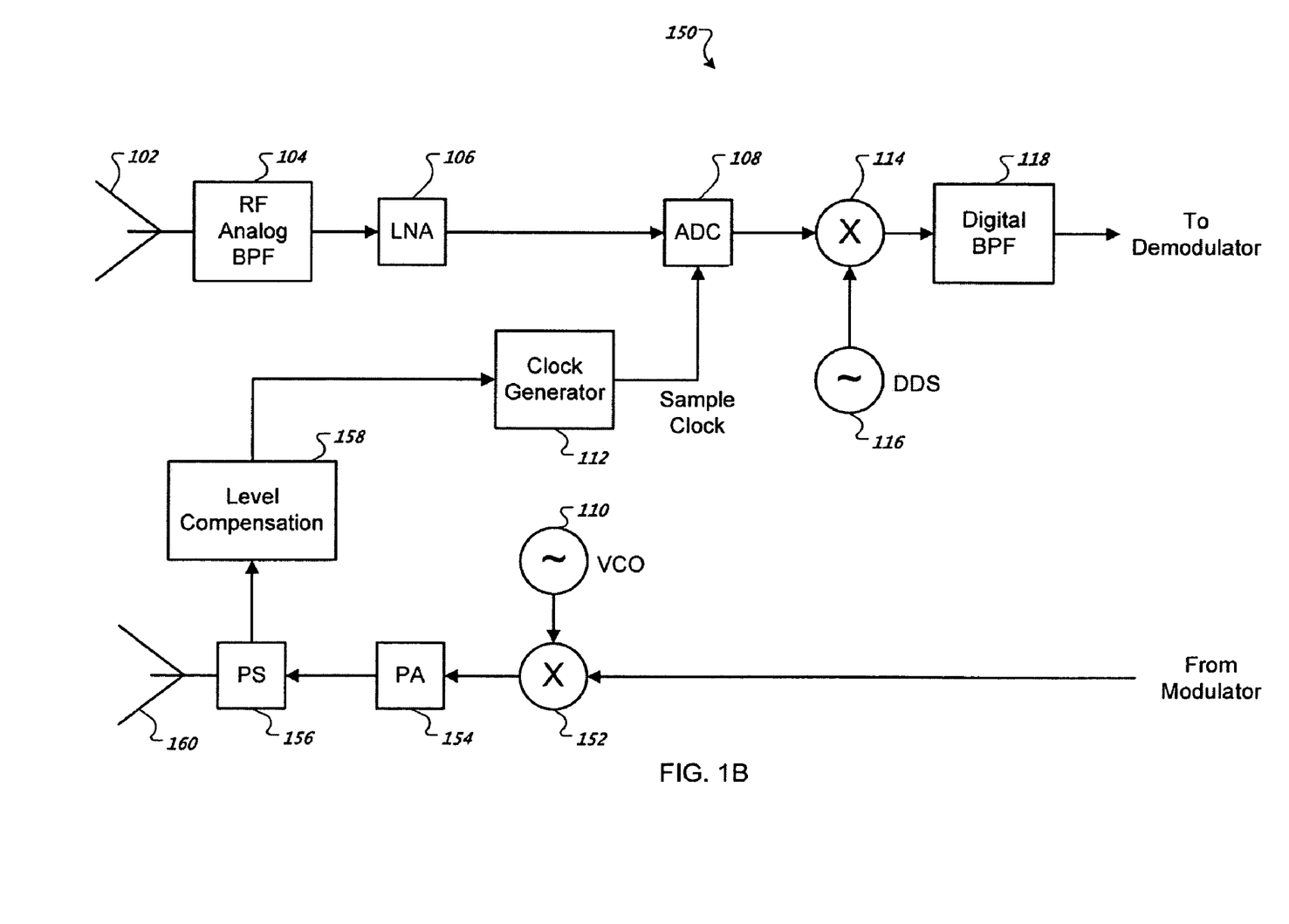

FIGS. 1A and 1B are example readers 100 and 150, respectively, for reducing noise in a receive path by directly sampling a received Radio Frequency (RF) signal. In some implementations, the reader 100 and 150 are RFID readers that includes a receiver portion (as illustrated) and/or a transmitter portion. The readers 100 and 150 may eliminate, minimize, or otherwise reduce transmitter phase noise by generating, for an analog-to-digital converter (ADC), a clock signal based, at least in part, on a signal generated from an oscillator used to generate the RF carrier for transmission signals. In some implementations, the ADC clock signal can be based, at least in part, on a transmission signal previously upconverted using the transmission oscillator. In other words, the ADC clock signal can be based, at least in part, on a portion of the transmission signal. In general, the receive-path noise (discussed in more detail below) can include or be based on one or more of the following: thermal noise, transmitter carrier noise, phase noise, interference from other RF sources, aliasing, quantization, and others. In some implementations, the noise signal in the receive path may mask or overwhelm the desired backscattered receive signal. In attempt to overcome this interference, the readers 100 and 150 can directly sample the receive-path signal using an ADC clock signal based, at least in part, on the transmission signal or the RF carrier used to upconvert the transmission signal to an RF signal. In some implementations, the mixing of the received RF signal and the ADC clock signal via the sampling process can reduce transmitter phase noise. By using the transmission signal or the local oscillator signal correlated to the transmission signal to generate the clock signal, the readers 100 and 150 may provide one or more of the following: reducing the received transmitter phase noise by basing the clock signal on the waveform used to drive the transmitter, improving the noise figure and/or thermal noise effects of the analog front end (AFE) resulting from less analog signal processing prior to the ADC and/or removal of an analog down-conversion mixer, reducing the noise effects of quantization by using a high sampling rate (e.g., 125MHz, 244 MHz) by spreading this quantization noise power over a high bandwidth which can be subsequently filtered out in digital signal processing, reducing the noise effects of quantization by using a high number of bits (e.g., 12) for the ADC, reducing the transmitter phase noise by basing the clock signal on the RF carrier used to drive the transmitter, and supporting multiple protocols by digitally baseband filtering (e.g., software defined radio), and others. In some implementations, the readers 100 and 150 under-sample the receive-path signal to utilize aliasing in the sampling process to down-convert the RF signal to an intermediate frequency $F_{IF}$ less than $F_s/2$ in the sampled data.

Referring to FIG. 1A, the reader 100 may, in some implementations, use an oscillator to generate a waveform used to transmit RF signals and directly sample received RF signals. For example, the reader 100 may generate a single waveform where a portion of the signal is converted to a clock signal for directly sampling the received RF signals and a portion is used to up-convert a signal to RF for transmission to transponders. By generating the clock signal using a common waveform source, the reader 100 may eliminate, minimize, or otherwise reduce frequency and/or phase noise associated with the transmission signal. In other words, the reader 100 may track inherent drifts in phase and/or frequency of the transmission signal in the clock signal to reduce such noise in the receive-path signal. In addition, the reader 100 can eliminate, minimize, or otherwise reduce the number of analog elements in the AFE that can introduce and/or amplify other noise in the reader 100.

Turning to a more detailed description of the reader 100, the reader 100, in this implementation, includes an antenna 102, an RF analog bandpass filter (BPF) 104, a low noise amplifier (LNA) 106, an ADC 108, a voltage controlled oscillator (VCO) 110, a clock generator 112, a mixer 114, a direct digital synthesizer (DDS) 116, and a digital BPF 118. While not illustrated, the reader 100 can include other elements such as those associated with processing digital signals, transmitting signals, noise cancellation, and/or others. The antenna 102 is configured to receive, from transponders, RF signals. The reader 100 may be a "mono-static" design, i.e., readers in which the transmitter and receiver share the same antenna or "bi-static" design, i.e., readers which use separate antennas for transmit and receive. The antenna 102 directs the received signal to the RF analog BPF 104. At a high level, the analog BPF 104 receives RF signals and passes a band of the received RF signals to the LNA 106 while substantially rejecting frequencies out of band. The LNA 106 amplifies the passed RF signal in light of the relative weakness of the transponder signal. The ADC 108 converts the analog signal to a digital signal and, in this implementation, directly samples the RF signal. In some implementations, the ADC 108 has sampling rates greater than 60 MHz (e.g., 244 MHz), which can reduce the required selectivity, shape factor and/or complexity of the analog BPF 108. As discussed above, the ADC 108 receives a clock signal based, at least in part, on the waveform used to generate RF transmission signals. In the illustrated implementations, this waveform is generated by the VCO 110.

The VCO 110 includes any hardware, software, and/or firmware operable to generate a signal at a frequency based, at least in part, on an input voltage. In some implementations, the output signal of the VCO 110 can be represented as:

$$x(t) = A\cos(2\pi f t + \phi(t)),$$

where A is the amplitude, f is the frequency, and $\phi(t)$ is the oscillator phase noise process. In some implementations, this VCO signal can be used as the carrier signal by the transmitter and to generate the clock signal for the ADC 108. The phase noise $\phi(t)$ present in the transmitter leakage signal can produce spectral "skirts" in the signal in the receive path. The VCO 110 directs a portion of the VCO signal to the transmitter portion of the reader 100 and a portion to the clock generator 112 for generating the sample clock signal.

The clock generator 112 can include any software, hardware, and/or firmware operable to generate a sample clock signal for the ADC 108 based, at least in part, on the VCO signal. For example, the clock generator 112 may include dividers for dividing the frequency of the received VCO signal to generate the sample clock signal. In some implementations, the clock generator 112 may represent the divided VCO signal, i.e., the clock signal, as:

$$c(t) = A\cos\left(\frac{2\pi f t + \phi(t)}{D_{clk}}\right)$$

where $D_{clk}$ represents the divisor of the clock generator 112. The clock generator divisor, $D_{clk}$, may be fixed or programmable. As illustrated in this expression, the clock signal can substantially track frequency and/or phase drifts in the transmission leakage noise. The sampling process of the ADC mixes the harmonics of the sampling clock c(t) with the input signal. In particular, if $D=\text{round}(D_{clk})$, i.e., D is an integer closest to $D_{clk}$, then the sampling process mixes the harmonic $$c_D(t) = A\cos\left(2\pi f \frac{D}{D_{clk}} + \phi(t)\frac{D}{D_{clk}}\right)$$

with the input signal which includes the transmitter leakage signal. The clock harmonic tracks the frequency and phase drift of the VCO, and thus it also tracks the frequency and phase of the transmitter leakage signal. As a result, the clock signal, in some implementations, can substantially reduce the leakage phase noise due to the mixing effect in the ADC sampling process (e.g., 20 dB).

As discussed above, the ADC 108 directly converts the RF signal to a digital signal and passes the digital signal to the mixer 114. The mixer 114 in combination with the DDS 116 down converts the digital signal to a baseband signal for demodulation. In some implementations, the DDS 116 comprises a fixed length sinusoid table. In some implementations, the ADC 108 may down convert the sampled signal based, at least in part, on the clock signal independent of a DDS. The digital BPF 118 receives the baseband signal and passes a specific band of interest while substantially rejecting other bands. For example, the digital BPF 118 may perform digital channel filtering. In short, the reader 100 may digitally provide channel filtering and down converting as compared with performing these processing steps in the analog portion of the AFE. In some implementations, these processes may be performed in a "software defined radio." As a result of digitally down-converting and channel filtering, such processes can be relatively more repeatable and at lower cost. In addition, the reader 100 may support multiple protocols independent of the need for multiple analog filters and switches. Also, the simpler AFE can lead to less signal losses and a lower receiver noise figure.

Referring to FIG. 1B, the reader 150 includes the receiver portion as described above and a mixer 152, a Power Amplifier (PA) 154, a Directional Coupler (DC) 156, a level compensation module 158, and an antenna 160. The transmission mixer 156 receives the baseband signal and upconverts the signal to an RF signal based, at least in part, on the waveform from oscillator 110. In other words, the transmission mixer 152 receives a signal from the VCO 110 and mixes this signal with the analog signal to generate the RF signal. The PA 154 amplifies the RF signal and directs the amplified signal to the DC 156. The DC 156 splits or otherwise directs a portion of the transmit signal to the level compensation module 158. In some implementations, the level compensator 158 may comprise either a voltage-variable attenuator or a digitally-controlled step attenuator, and may be controlled in either an open-loop manner (i.e. a setting corresponding to the known transmitter output power), or in a closed-loop manner. In the case that the output of the PA 154 has a wide output range (e.g., 0 dBm to 33 dBm), the level compensation module 158 can reduce the output power range prior to passing the transmission signal to the clock generator 112. In some implementations, the PS 156 may pass the transmission signal directly to the clock generator 112 independent of a level compensator. In this case, the dynamic range of the PA output power may be small enough that level compensation can be omitted. In using the transmission signal to generate the ADC clock signal, the reader 150 can, in some implementations, track phase noise added by the PA 154, as compared with the reader 100. The antenna 160 transmits the transmission signal.

Figure 2:
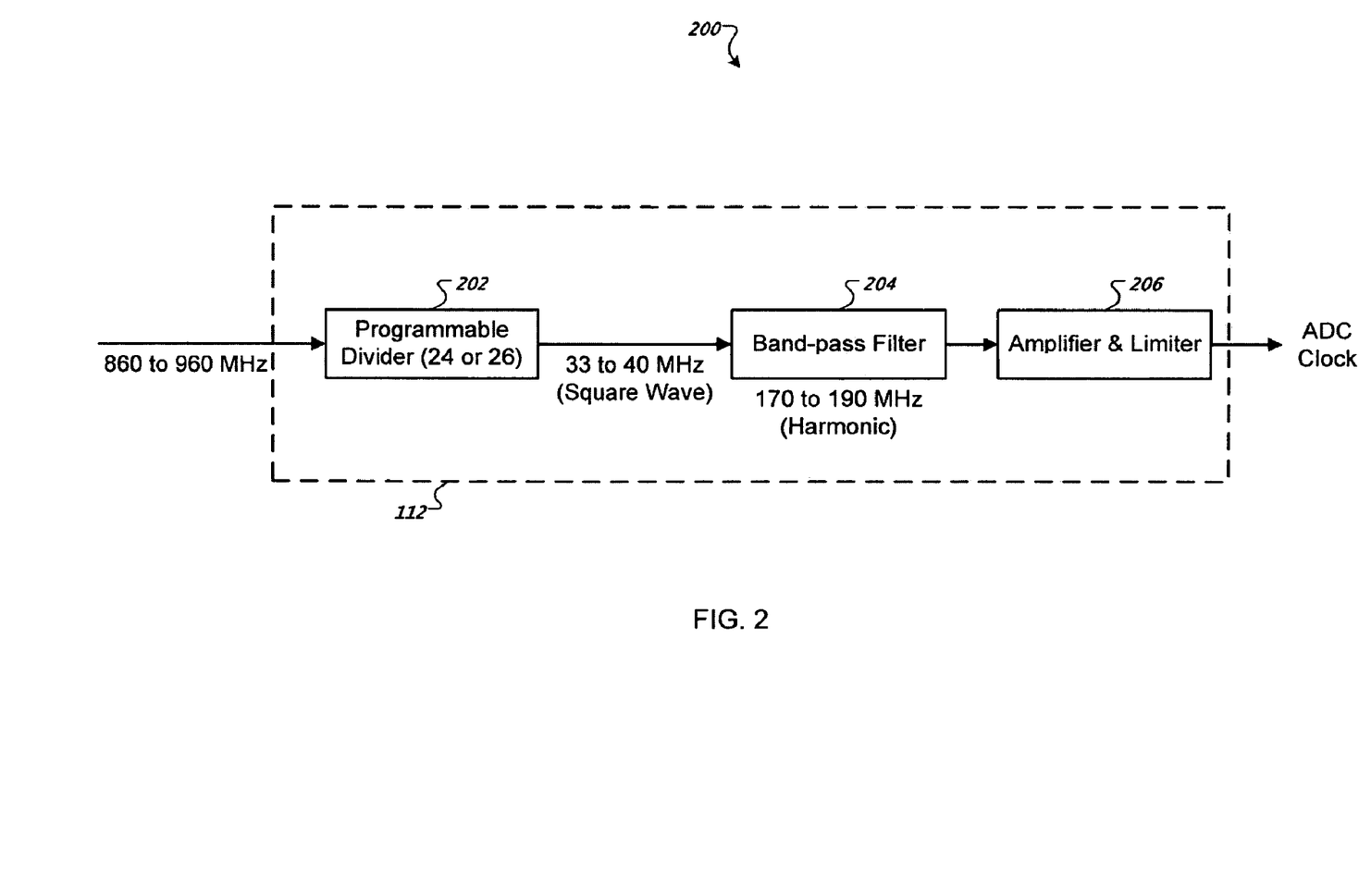
FIG. 2 is an example clock generator of FIGS. 1A and 1B in accordance with some implementations of the present disclosure.

FIG. 2 illustrates an example implementation of the clock generator 112 of FIGS. 1A and 1B in accordance with some implementations of the present disclosure. In particular, the illustrated clock generator 112 divides the VCO signal, the transmitter signal, and/or a combination of the foregoing and filters out a specific harmonic used to generate the sample clock signal. As mentioned above, the generated sample clock signal tracks drifts in the frequency and/or phase of the transmission frequency to eliminate, minimize, or otherwise reduce frequency and/or phase noise. In addition, this clock generator 112 can provide good image frequency rejection because the image frequencies can be changed by altering the frequency divisor.

In the illustrated implementation, the clock generator 112 includes a programmable frequency divider 202, a BPF 204, and an amplifier/limiter 206. The programmable divider 202 receives the VCO signal from the VCO 110 and/or the transmitter signal from the PS 156. In some implementations, the received signal can be 860 to 960 MHz. The programmable divider 202 divides the frequency of the received signal by a number such as an integer (e.g., 24, 26) to generate a divided signal oscillating at the divided frequency (e.g., 33 to 40 MHz). In some implementations, the programmable divider 202 is a programmable integer frequency divisor (e.g., Hittite HMC394). In addition, the divisor of the frequency divider 202 may be dynamically changed to allow different sampling frequency choices for a given received frequency, and as a result, such frequency changes may mitigate or otherwise reduce image frequency problems. The programmable divider 202 passes the divided signal to the BPF 204, and the BPF 204 filters out a desired harmonic (e.g. 3, 4, 5) of the divided signal. In some implementations, the programmability of the clock generator 112 may be limited by the design of the harmonic filter 204. The operation of the programmable divider 202 and the BPF 204 may be represented as using a programmable rational divisor, e.g., $$D_{clk} = \frac{N}{M}.$$

In this case, the frequency of the received signal is divided by N to generate a divided signal oscillating at the divided frequency and then the Mth harmonic of the divided signal is filtered from the divided signal to produce a signal which is M/N times the frequency of the received signal. As a result of the filtered out harmonic being based on the received signal, the harmonic signal can substantially track the VCO and/or transmitter signal in frequency and phase noise. An example of a rational divisor is as follows:

$$D_{clk} = \frac{24}{5} \text{ or } D_{clk} = \frac{26}{5}.$$

As depicted, these rational divisors are centered around the integer five. In some implementations, the divisor of the programmable divider 202 may be set to an integer such as 5 and the bandpass filter 204 and amplifier/limiter 206 may be simplified or removed, substantially using the output of the divider 202 directly as the ADC sample clock. Such implementations can be susceptible to RF nulls, although this performance degradation may be acceptable in some applications.

The filtered-out harmonic is passed to the amplifier/limiter 206, and the amplifier/limiter 206 amplifies the harmonic and limits the amplitude to generate a square wave signal as the sample clock signal. In some implementations, the illustrated clock generator 112 may exclude the limiter and merely amplify the harmonic to generate a sinusoid as the sample clock signal. After the ADC 108 directly samples the RF signal in accordance with the clock signal, the digital signal processor can down-convert the desired channel to baseband for demodulation. As discussed above, the down conversion is done in combination with the DDS 116. As a result of using the clock generator 112 illustrated in FIG. 2, the DDS 116, in some implementations, can be a fixed sinusoid table with length equal to the harmonic M. In some implementations, the fixed sinusoid table may be used regardless of the channel frequency of the VCO.

Figure 3:
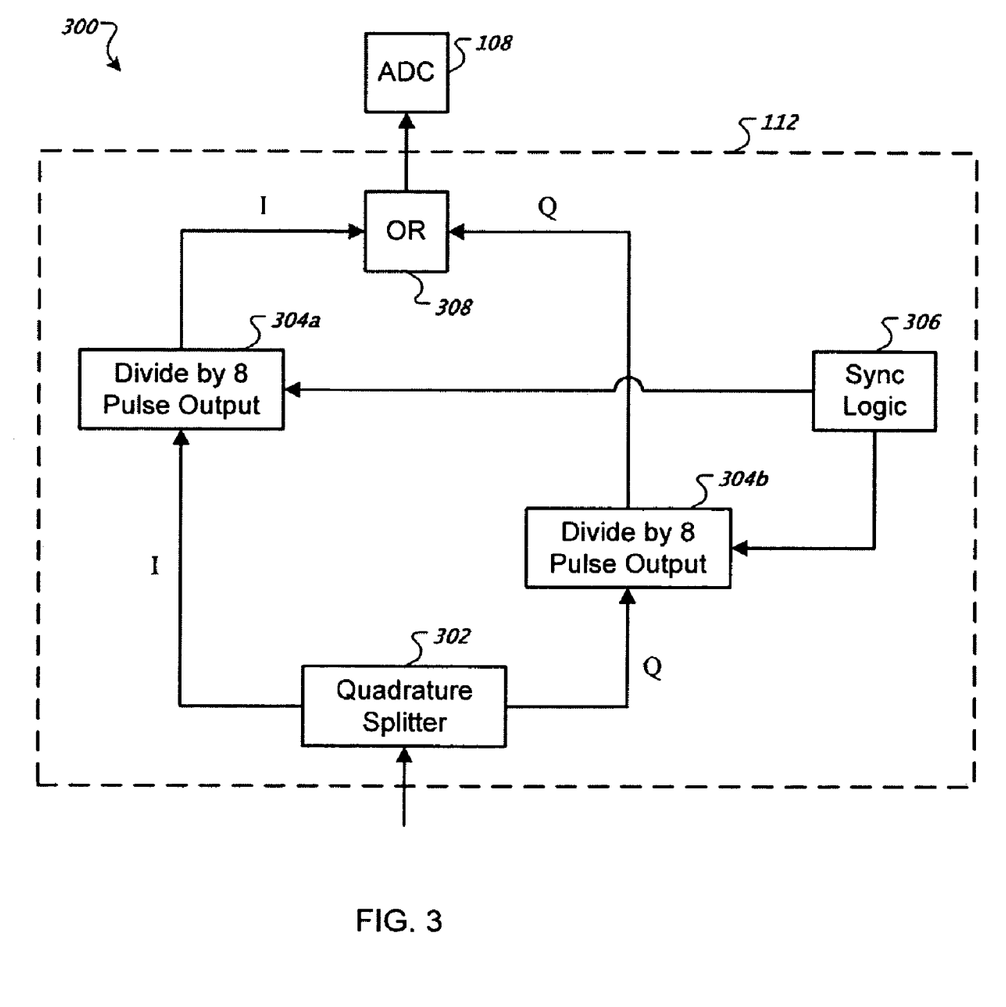
FIG. 3 is another example clock generator of FIGS. 1A and 1B in accordance with some implementations of the present disclosure.

FIG. 3 illustrates another example implementation of the clock generator 112 of FIGS. 1A and/or 1B in accordance with some implementations of the present disclosure. The illustrated clock generator 112 can use non-uniform sample spacing to generate the clock signal. In a particular implementation, the illustrated clock generator 112 divides the received signal into two components and then divides each component to produce two divided components. The combination of the divided components generates the sample clock signal for the ADC 108. For example, the clock generator's input signal can be split 90 degrees into I/Q (in-phase and quadrature phase) components, then each component can be separately divided down by integer factors (e.g., 8) and then summed (or'd) together to generate the clock signal. Similar to the clock generator illustrated in FIG. 2, the generated sample clock signal tracks drifts in the frequency and/or phase of the transmission frequency to eliminate, minimize, or otherwise reduce frequency and/or phase noise during sampling by the ADC 108. In addition, this clock generator 112 can provide good image frequency rejection because the image frequencies can be changed by altering the frequency divisor.

In the illustrated implementation, the clock generator 112 includes a quadrature splitter 302, programmable dividers 304a and 304b, sync logic 306, and an OR logic gate 308. The quadrature splitter 302 receives the signal from the VCO 110 and/or the directional coupler 156 and generates an in-phase component and a quadrature component. The in-phase component 304a is passed to the programmable divider 304a, and the programmable divider 304a divides the frequency of the in-phase component to produce a divided in-phase component oscillating at the divided frequency. In some implementations, the programmability of the clock generator 112 can be limited by the range of divisors available from the programmable dividers 304a and 304b. The quadrature component is passed to the programmable divider 304b, and the programmable divider 304b divides the frequency of the quadrature component to produce a divided quadrature component oscillating at the divided frequency. Each divided component is passed to the OR logic gate 308, and the OR logic gate 308 combines the divided components to generate the sample clock signal. The sync logic 306 synchronizes the dividers 304a and 304b to substantially ensure that the two dividers are approximately evenly spaced. In some implementations, the mixing of the RF signal and the clock signal at the ADC 108 images the RF signal to baseband. In this case, a DDS may not be required in the receiver module of the reader 100 and/or 150. In other words, after the RF signal is sampled by the ADC 108, the sample stream is de-multiplexed into I and Q sample streams.

Figure 4:
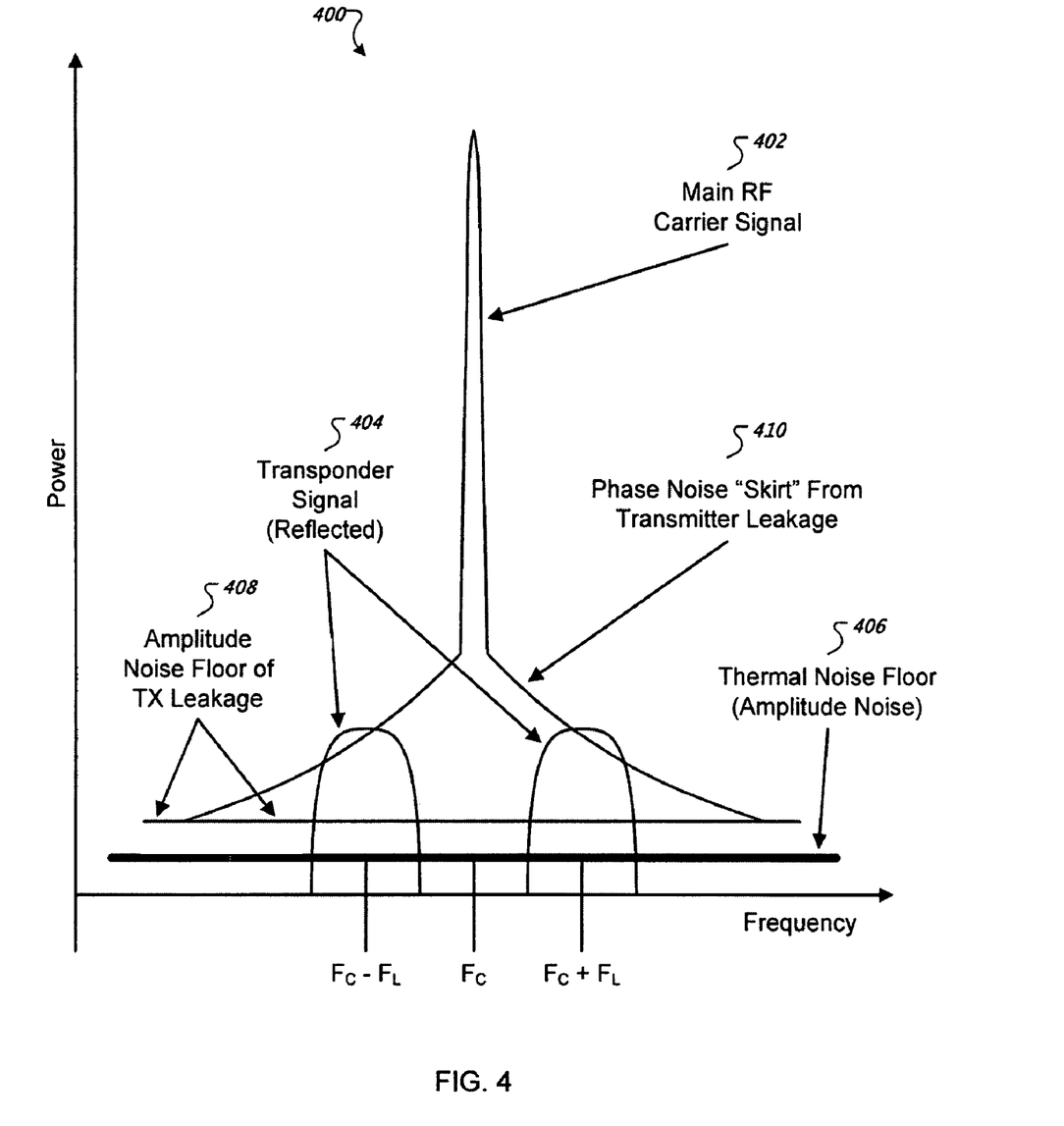
FIG. 4 is an example graph illustrating signals in the frequency domain.

FIG. 4 is an example graph 400 in the frequency domain of the signal in the receiver path of the reader 100 and/or 150. In general, the receiver-path signal may include one or more of the following: transponder signals reflected from RFID transponders in the interrogation zone, thermal noise, transmitter leakage, and interference signals from interference sources in the area. The graph 400 illustrates a main RF transmitter signal 402, a transponder signal 404, thermal noise floor 406, amplitude noise floor from the leakage transmitter signal 408, and phase noise 410. While not illustrated, the graph 400 can include other signals that may include and/or generate signals that interfere with the detection of the transponder signal 404. The transmitter signal 402 represents the RF signal transmitted by the reader 100 and/or 150 to transponders within an associated interrogation zone. The transponder signal 404 is the RF signal backscattered by transponders in the interrogation zone in response to at least the transmitter signal 402.

Turning to a description of the noise, the thermal noise floor 406 can result from, among other things, random thermal motion of electrons within resistive elements in the reader 100 and/or 150. In some implementations, the thermal noise 406 has power spectral density $N_0=kT$, where k is Boltzmann's constant and T is the circuit temperature. In the case that the AFE has an associated gain G and the receiver AFE were substantially noiseless, the density level of the thermal noise 406 can be represented as kTG. In some implementations, noise degradation in the AFE can result in noise output higher than the represented thermal noise. Noise figure, well known to those skilled in the art, is a standard measure of how much noise a receiver adds to the receive-path signal and is commonly expressed as a logarithmic value in decibels as follows:

$$NF = 10 \times \log_{10}(F) \text{ dB}$$

where F is typically referred to as the noise factor. In some implementations, the noise factor can be specified relative to the thermal noise 406 and denoted as the letter F, $$F = \frac{kTG + AFE \text{ noise}}{kTG}$$

For the purposes of comparing the relative effects of the various noise sources on the transponder signal, noise is typically referenced to the input antenna 102 such as representing addition of the thermal noise 406 as added proximate the antenna 102. In this representation, the receiver can be treated as substantially noiseless and use a thermal noise source referenced to the input as kTF.

Turning to a description of transmitter leakage noise, the transponder signal 404 communicates information to the reader 100 and/or 150 using radar cross section (RCS) modulation. The modulated RCS signal 404 is often separated from the transmit carrier 402 by tens or hundreds of kilohertz to allow some filtering of the transmitter leakage signal. In some cases, the transmit carrier leakage signal can be more than a billion times more powerful than the transponder signal 404, and therefore the leakage signal's amplitude noise 408 can be significant relative to the received transponder signal level. In addition to the leakage signal's amplitude noise, the receive-path signal may also include oscillator-phase noise 410 as part of the leakage signal. The phase noise 410 can have a power spectral density whose level is relative to the TX carrier leakage which typically falls off 6 dB per octave across the transponder communications band. As with the thermal noise, the transmitter leakage may be referenced with respect to the antenna 102 such as representing addition of the phase noise 410 as added proximate the antenna 102. In this case, the transmitter leakage L(f) can be frequency dependent and have an argument f.

In addition to the amplitude noise 408, phase noise 410, and the thermal noise 406, interference signals from other RF sources, including other RFID readers, can be received at levels more than a million times more powerful than the transponder signal 404. In some implementations, the reader 100 and/or 150 can be very linear to accommodate such a large dynamic range without losing the weak transponder signal 404 due to distortion. In addition, the reader 100 sufficiently attenuates interference signals that can alias onto the transponder signal 404 before the ADC sampling process.

In addition to external elements, internal elements may generate noise in the receive-path signal. For example, sampling of the receive-path signal can add aliasing distortion which is interference to signals at the transponder image frequencies. The ADC 108 can also add quantization noise, which is determined by the number of bits of resolution of the ADC 108. For an ideal ADC with N bits resolution, an input voltage range of $V_{ADC}$, and sampling rate $F_s$, broadband quantization noise floor can be represented as:

$$Q_{ADC} = \left(\frac{V_{ADC}}{2^N}\right)^2 \cdot \frac{1}{12 \cdot F_s}.$$

Figure 5A:
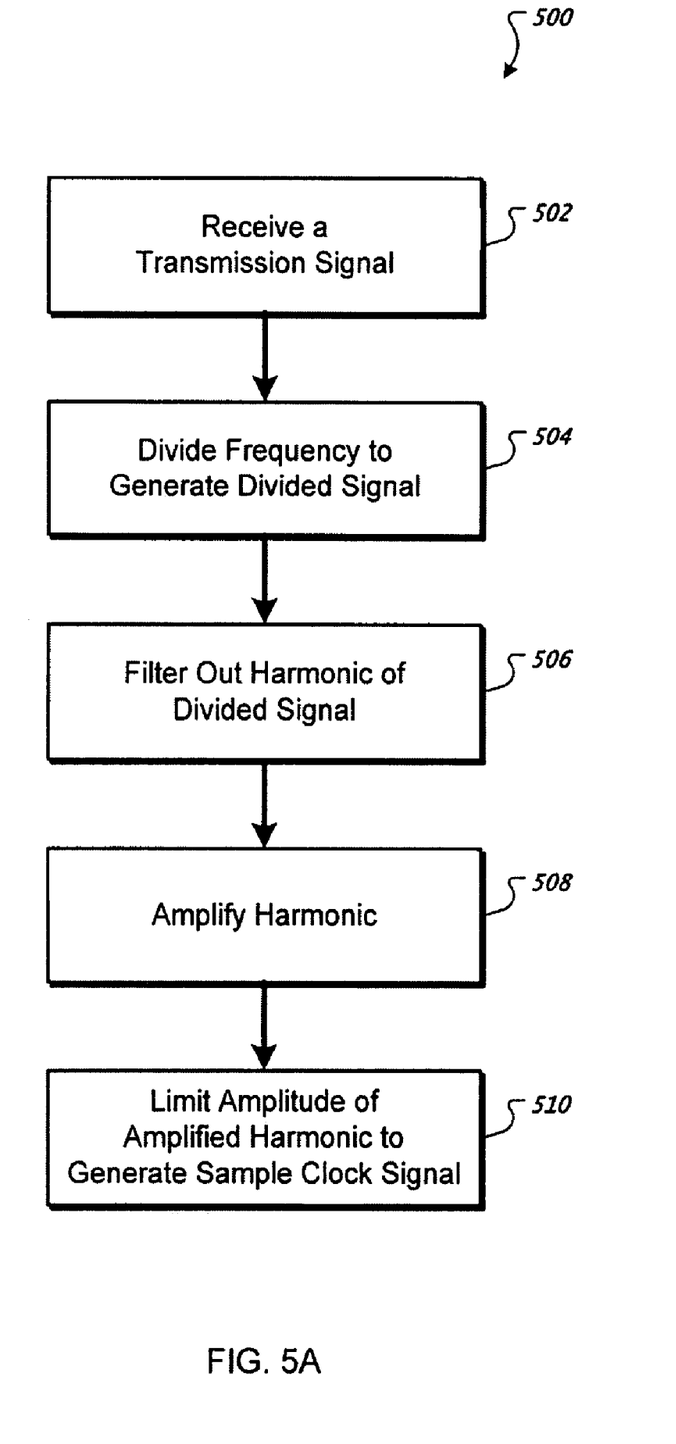
FIGS. 5A and 5B are flow charts illustrating example methods for generating same clock signals.
Figure 5B:
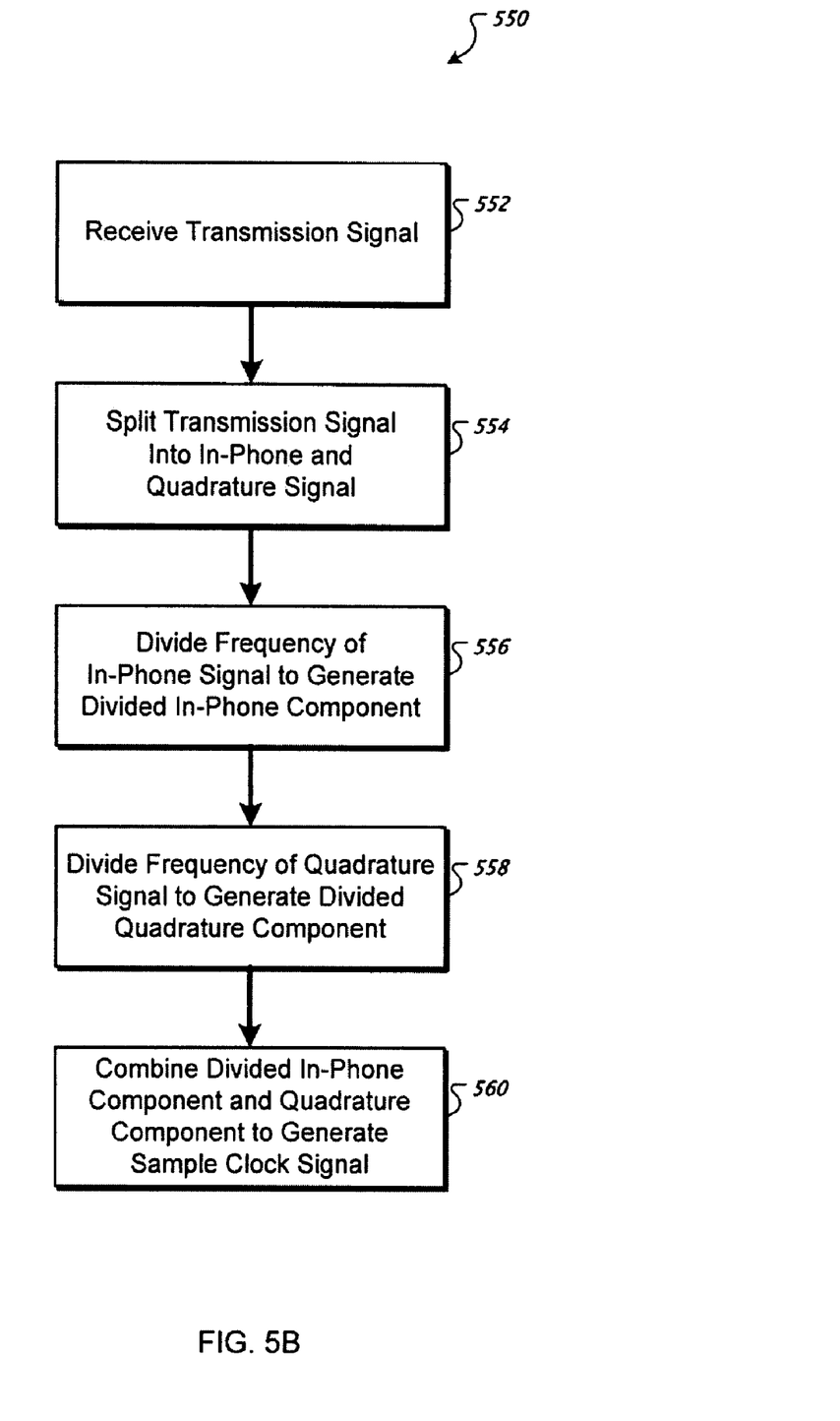

FIGS. 5A and 5B are flowcharts illustrating example methods 500 and 550, respectively, for generating clock signals using a transmission signal in accordance with some implementations of the present disclosure. Generally, method 500 describes an example technique where the transmission signal is divided down and a harmonic is filtered out of the divided signal to form the sample clock signal. Method 550 describes an example technique where an in phase and a quadrature signal are divided down and combined to form the sample clock signal. The reader 100 and/or 150 contemplates using any appropriate combination and arrangement of logical elements implementing some or all of the described functionality.

Referring to FIG. 5A, the method 500 begins at step 502 where a transmission signal is received. For example, the programmable frequency divider 202 may receive a transmission signal from the VCO 110 and/or the directional coupler 156. At step 504, the frequency of the transmission signal is divided by an integer to generate a divided signal oscillating at the divided frequency. In the example, the programmable divider 202 can divide the transmission frequency by an integer (e.g., 24, 26) to generate a divided signal. Next, at step 506, a harmonic of the divided signal is filtered out. Returning to the example, the BPF 204 can filter out a harmonic (e.g., $2^{nd}$, $3^{rd}$, $5^{th}$) of the divided signal received from the divider 202. The harmonic is amplified at step 508, and the amplitude is limited at step 510 to generate the sample clock signal. As for the example, the amplifier/limiter 206 can amplify the harmonic and limit the amplitude to produce substantially a square waveform as the sample clock signal.

Referring to FIG. 5B, the method begins at step 552 where a transmission signal is received. For example, the quadrature splitter 302 can receive a transmission signal from the VCO 110 and/or the RF signal. At step 554, the transmission signal is split into an in-phase component and a quadrature component. In the example, the quadrature splitter 302 can split the transmission signal into an in-phase component and a quadrature component. Next, at step 556, the frequency of the in-phase component is divided to generate a signal oscillating at the divided frequency. Turning to the example, the divider 304*a* can divide the in-phase component to generate a divided in-phase component. The frequency of the quadrature component is divided to generate a signal oscillating at the divided frequency at step 558. As for the example, the divider 304*b* can divide the quadrature component to generate a divided quadrature component. In some implementations, the dividers 304*a* and 304*b* can be synchronized using the sync logic 306. At step 560, the divided in-phase component and the divided quadrature component are combined to form the sample clock signal. In the example, the Or logic gate 308 can add or otherwise combine the divided in-phase component and the divided quadrature component are combined to form the sample clock signal.

A number of embodiments of the invention have been described. Nevertheless, it will be understood that various modifications may be made without departing from the spirit and scope of the invention.

What is claimed is:

1. A reader for directly sampling Radio Frequency (RF) signals, comprising:
   a clock generator configured to generate a sample clock signal based, at least in part, on an input signal including at least a portion of a transmission RF signal; and
   an Analog-to-Digital Converter (ADC) configured to directly sample RF signals in a receive path of the reader using the sample clock signal to generate a digital signal, wherein mixing of the RF signal and the sample clock, through the sampling process in the ADC, reduces phase noise associated with transmission leakage noise in the receive path.

2. The reader of claim 1, further comprising an oscillator configured to generate an RF carrier used to upconvert transmission signals to RF signals and pass the RF carrier to a transmitter section and the clock generator, wherein the signal associated with transmitting RF signals comprises the RF carrier.

3. The reader of claim 1, further comprising a directional coupler configured to direct the portion of a transmission RF signal to the clock generator.

4. The reader of claim 1, wherein the clock generator comprises:
   a frequency divider with an integer divisor operable to divide a frequency of the input signal to generate a signal oscillating at the divided frequency; and
   a Band Pass Filter (BPF) configured to filter out a selected harmonic of the divided signal to generate the sample clock signal.

5. The reader of claim 4, wherein the clock generator further comprises an amplifier configured to amplify the selected harmonic prior to passing the sample clock signal to the ADC.

6. The reader of claim 4, further comprising:
   a Direct Digital Synthesizer (DDS) configured to generate waveforms based, at least in part, on the selected harmonic of the divided signal; and
   a mixer configured to mix the digital and the generated DDS waveform to down convert the digital signal to a baseband signal for demodulation.

7. The reader of claim 6, wherein the DDS is a fixed sinusoid table with a length equal to a harmonic number of the divided transmission frequency.

8. The reader of claim 1, wherein the clock generator comprises:
   a splitter configured to split the input signal into a first component and a second component, wherein a phase of the first component and a phase of the second component are different;
   a first integer divider configured to divide the frequency of the first component to generate a first divided signal oscillating at the divided frequency of the first component;
   a second integer divider configured to divide the frequency of the second component to generate a second divided signal oscillating at the divided frequency of the second component; and
   a combining element configured to combine the first divided signal and the second divided signal to generate the sample clock signal.

9. The reader of claim 8, wherein the splitter comprises a quadrature splitter configured to generate an in-phase component and a quadrature component based, at least in part, on the input signal.

10. The reader of claim 8, wherein the combining element comprises an OR logic gate.

11. The reader of claim 8, wherein mixing of the RF signal and the sample clock directly down converts the RF signal to baseband.

12. The reader of claim 8, wherein the clock generator further comprises sync logic configured to substantially synchronize the first integer divider and the second integer divider.

13. A method for directly sampling RF signals, comprising:
   generating a sample clock signal for an ADC based, at least in part, on an input signal including at least a portion of a transmission RF signal; and
   directly sampling RF signals in a receive path using the sample clock signal to generate a digital signal, wherein mixing of the RF signal and the sample clock, through the sampling process in the ADC, reduces phase noise associated with the transmission signal in the receive path.

14. The method of claim 13, further comprising:
   generating an RF carrier used to upconvert transmission signals to RF signals, wherein the signal associated with transmitting RF signals comprises the RF carrier; and
   passing the RF carrier to a transmitter section and a clock generator, wherein the clock generator generates the sample clock signal.

15. The method of claim 13, further comprising directing, to the clock generator, a portion of RF signals being transmitted, wherein the portion of the transmission RF signal comprises the portion of the RF signals being transmitted.

16. The method of claim 13, further comprising:
   dividing a frequency of the input signal to generate a signal oscillating at the divided frequency; and
   filtering out a selected harmonic of the divided signal to generate the sample clock signal.

17. The method of claim 16, further comprises amplifying the harmonic prior to directly sampling RF signals.

18. The method of claim 16, further comprising:
   generating waveforms based, at least in part, on the selected harmonic of the divided signal; and
   mixing the digital and the generated waveform to down convert the digital signal to a baseband signal for demodulation.

19. The method of claim 18, wherein the DDS is a fixed sinusoid table with a length equal to a harmonic number of the divided transmission frequency.

20. The method of claim 13, further comprising:
   splitting the input signal into a first component and a second component, wherein a phase of the first component and a phase of the second component are different;
   dividing a frequency of the first component to generate a first divided signal oscillating at the divided frequency of the first component;

dividing a frequency of the second component to generate a second divided signal oscillating at the divided frequency of the second component; and combining the first divided signal and the second divided signal to generate the sample clock signal.

21. The method of claim 20, further comprising generating an in-phase component and a quadrature component based, at least in part, on the input signal.

22. The method of claim 20, wherein mixing of the RF signal and the sample clock directly down converts the RF signal to baseband.

23. The method of claim 20, further comprising substantially synchronizing the division of the first component and the division of the second component.

24. A system, comprising:
a means for generating a signal for transmitting RF signals;
a means for passing the transmission signal to a transmitter and a clock generator;
a means for generating a sample clock signal based, at least in part, on the transmission signal; and
a means for directly sampling RF signals in a receive path using the sample clock signal to generate a digital signal, wherein mixing of the RF signal and the sample clock, through the sampling process in the ADC, reduces phase noise associated with the transmission signal in the receive path.

* * * * *